United States Patent
Murai et al.

(10) Patent No.: US 7,103,955 B2
(45) Date of Patent: Sep. 12, 2006

(54) MACHINING APPARATUS AND MACHINING LINE PROVIDED WITH SAME

(75) Inventors: Kazutaka Murai, Anjo (JP); Shigeto Noma, Anjo (JP); Toshiyuki Andou, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 47 days.

(21) Appl. No.: 10/900,398

(22) Filed: Jul. 28, 2004

(65) Prior Publication Data

US 2005/0059538 A1    Mar. 17, 2005

(30) Foreign Application Priority Data

Jul. 29, 2003    (JP)    ............................. 2003-203166

(51) Int. Cl.
*B21D 5/02*   (2006.01)
*B21D 43/00*  (2006.01)
*B25J 15/00*  (2006.01)

(52) U.S. Cl. .............................. 29/430; 29/418; 29/559

(58) Field of Classification Search .................. 29/430, 29/418, 559
See application file for complete search history.

(56) References Cited

U.S. PATENT DOCUMENTS

| | | | | |
|---|---|---|---|---|
| 4,486,928 A | * | 12/1984 | Tucker et al. | ................ 29/26 A |
| 5,020,201 A | * | 6/1991 | Kitamura | ..................... 29/27 C |
| 5,803,886 A | * | 9/1998 | Schweizer | .................... 483/31 |

FOREIGN PATENT DOCUMENTS

JP    2001-255922    *   9/2001

* cited by examiner

*Primary Examiner*—David P. Bryant
*Assistant Examiner*—Christopher M. Koehler
(74) *Attorney, Agent, or Firm*—Bacon & Thomas, PLLC

(57) ABSTRACT

A drill fitted to an adapter is used to drill a hole in a workpiece fixed on a table of a machining center. When the hole drilling is finished, the drill is removed from the adapter, and a workpiece holding jig is fitted to the adapter. Then, the adapter is lowered, and the workpiece holding jig takes the workpiece for which the hole drilling operation has been finished. Following this, the adapter is raised, and the workpiece is temporarily held in the machining center. Then, in this state, the next workpiece is mounted on the table of the machining center. Accordingly, by temporarily holding the workpiece, for which the hole drilling operation has been finished, in the machining center, mounting of the next workpiece is simplified.

5 Claims, 7 Drawing Sheets

MACHINING APPARATUS AND MACHINING LINE PROVIDED WITH SAME

CROSS-REFERENCE TO RELATED APPLICATION

This application claims, under 35 USC 119, priority of Japanese Patent Application No.2003-203166 filed on Jul. 29, 2003, the teachings of which are incorporated herein by reference in their entirety, including the specification, drawings and abstract.

BACKGROUND OF THE INVENTION

1. Field of the Invention

The invention relates to a machining apparatus for machining a workpiece, to a general-purpose apparatus, e.g., a "machining center", that performs a variety of different types of machining operations by switching between various machining tools, and to a production line provided with a plurality of machining apparatuses.

2. Description of the Related Art

Conventionally, a production line for automatic transmissions (hereinafter referred to as "A/T" or "A/Ts") includes a machining line with plural machines for machining various types of workpieces, namely, components of the A/T. This machining line includes a plurality of machining centers (hereinafter referred to as "M/C" or "M/Cs") that are arranged in a line and a robot that mounts and removes the workpieces to/from the table of each M/C. Further, the same type of machining line is also utilized in production lines for devices and machines other than A/Ts.

An example of a machining line provided with a plurality of M/Cs and a robot is described in Japanese Patent Laid-Open Publication No. 2001-255922 as having three M/Cs positioned in a straight line and a single robot that travels along the line of M/Cs for mounting and removing respective workpieces to/from the tables of the M/Cs.

In the machining line disclosed in Japanese Patent Laid-Open Publication No. 2001-255922, the robot removes an unmachined workpiece from a workpiece carrying device, and following mounting of the unmachined workpiece on a table of a first M/C, the first M/C machines the workpiece. Next, the robot removes the workpiece (the machining of which has been finished at the first M/C) from the table of the first M/C, and carries it to a second M/C that performs the next machining step. The workpiece is then mounted on the table of the second M/C where it is further machined by the second M/C. Then, the robot removes the workpiece (the machining of which has been finished by the second M/C) from the table of the second M/C, and carries it to an nth M/C that performs the next machining step. The workpiece is then mounted on the table of the nth M/C, and the nth M/C performs another machining step. Lastly, the robot removes the workpiece (after completion of machining by the nth M/C) from the table of the nth M/C, and then another workpiece carrying device carries the workpiece away. In this way, the machining processes of the first to nth M/Cs are performed in sequence on the workpiece.

However, with the above-described machining line disclosed in Japanese Patent Laid-Open Publication No. 2001-255922, the robot does not return to the first workpiece carrying device (carrying-in device) until the machining of a given workpiece has been finished by the nth M/C. Accordingly, while a given workpiece for which machining has been completed by the first M/C is being processed by the second M/C, it is not possible to mount another workpiece in the first M/C. As a result, machining of the next workpiece cannot be performed by the first M/C. In addition, similarly, while a given workpiece that has been finished by the second M/C is being further machined by the nth M/C, it is not possible to mount successive workpieces in the first and second M/Cs. Accordingly, machining of the successive workpieces cannot be performed by the first and second M/Cs. Thus, there is substantial wasted time in the operation of this machining line, and the machining operations are not performed efficiently. Thus, a long time is required for the completion of machining of a given number of workpieces.

In order to address these problems, it would be possible to modify the machining operation of the machining line disclosed in Japanese Patent Laid-Open Publication No. 2001-255922 such that, following transfer of a given workpiece that has been finished at the first M/C to the second M/C, the robot moves back to the carrying-in device and removes an unmachined workpiece therefrom, mounts it on the table of the first M/C, and then carries the workpiece, for which machining has been finished at the second M/C, to the nth M/C, and mounts it therein. Following carrying to the nth M/C in the above mentioned manner, the robot could be made to travel back to the first M/C so as to remove the workpiece for which machining has been finished, to carry the workpiece to the table of the second M/C, and to mount it thereon. The robot could then be made to travel back to the carrying-in device and remove another unmachined workpiece therefrom, and to mount this workpiece on the table of the first M/C. In addition, similar robot operational control could be executed when a given workpiece finished at the nth M/C is carried to the carrying-out device by the robot. However, if robot operation control were to be executed in this manner, the robot would be subjected to repeated forward-and-backward movements between the carrying-in device, the first, second and nth M/Cs, and the machined workpiece carrying-out device. Accordingly, there would still be substantial wasted time in the machining operation.

Moreover, the process requires the robot to execute mounting and removal of the given workpieces for each M/C, as a result of which the workpiece mounting and removal operations are complicated. In addition, the robot is required to execute a sequence of operations, namely, mounting the workpiece, removing the workpiece and movement along the M/C line. Accordingly, the robot operation control becomes complicated and cumbersome.

FIG. 7 illustrates a machining line 1 including a predetermined number n (n≧2) of M/Cs arranged in a line, and temporary workpiece stations respectively located between the M/Cs. More specifically, the machining line 1, includes a first M/C 2, a second M/C 3, an nth M/C 4, an unmachined workpiece placement station (hereinafter referred to as "workpiece station") 6, a first M/C post-machining temporary workpiece station 7, a second M/C pre-machining temporary workpiece station 8, a second M/C post-machining temporary workpiece station 9, an nth M/C pre-machining temporary workpiece station 10, a completed workpiece station 11, a robot 13, and a guide rail 14.

The robot 13 is, for example, a conventional articulated arm robot. As shown in FIG. 7, the robot 13 is provided with a main body 13a and a first arm 13b connected to the main body 13a for horizontal rotation and raising and lowering relative to the main body 13a. A second arm 13d at one end carries a workpiece holder and is telescopically connected to the first arm 13b for retraction and extension relative thereto. Similar to the structure shown in FIG. 4(a) (described hereinafter), the workpiece holder is connected to the second arm 13*d* so as to allow relative rotation around an axis that is perpendicular to the view in FIG. 7.

Accordingly, the workpiece holder 13*c* is capable of movement upward and downward, left and right, and forward and backward, within ranges of movement of the first and the second arms 13*b* and 13*d*. Further, the workpiece holder 13*c* is maintained in a substantially horizontal position with movement of the first and second arms 13*b* and 13*d*, through use of a conventional mechanism. Of course, the robot 13 is not limited to the above described configuration, and any robot that can be utilized in the machining line 1 and which is capable of mounting and removing the workpiece 5 to/from the respective M/Cs 2, 3 and 4, may be used. The robot 13 is mounted for movement along the guide rail 14 along which each of the M/Cs 2, 3 and 4 is positioned.

Next, the operation of the machining line 1 shown in FIG. 7 will be explained. First, the workpiece 5, is carried to the workpiece station 6 in the vicinity of the first M/C 2 and placed thereon. Then, the main body 13*a* of the robot 13 is moved to a predetermined position that corresponds with the first M/C 2, and the first and second arms 13*b* and 13*d* are moved to retracted positions. Then, the robot 13 is activated and the first arm 13*b* is appropriately rotated in a horizontal plane and appropriately vertically positioned. Moreover, the second arm 13*d* is appropriately extended-retracted relative to the first arm 13*b*. As a result, the workpiece holder 13*c* is positioned, as shown by the dot-dash line, at the workpiece station 6.

The workpiece holder 13*c* holds the workpiece 5 at the workpiece station 6, and then the first and second arms 13*b* and 13*d* operate to move the workpiece holder 13*c* to the position indicated by the solid line. At this time, the workpiece 5 held in the workpiece holder 13*c* is moved to a fixing point 2*k* on top of a table of the first M/C 2 where it is fixed to the table. Following this, the first and second arms 13*b* and 13*d* are retracted back to their original positions.

The workpiece 5 on top of the table of the first M/C 2 is fixed thereto by a clamping device (not shown), and the first M/C 2 is operated to perform a first machining operation on the workpiece 5. When the first machining of the workpiece 5 is finished, the clamping device releases the workpiece 5. Then, both arms 13*b* and 13*d* of the robot 13 are operated to grasp the workpiece 5 with the workpiece holder 13*c*, to remove the workpiece 5 from the table of the first M/C 2, and to then temporarily place the workpiece at the first M/C post-machining temporary workpiece station 7 as indicated by the dot-dash line in FIG. 7. Next, both arms 13*b* and 13*d* of the robot 13 are moved back towards the workpiece station 6, and once the workpiece holder portion 13*c* has grasped the next workpiece 5 at the workpiece station 6, in a similar manner as before, and places it on top of the table of the first M/C 2. Then, the next workpiece 5 is fixed to the table of the N/C 2, and the first machining operation is again executed.

Next, the robot 13 grasps the workpiece 5, for which the first machining has been completed and which has been temporarily placed at the first M/C post-machining temporary workpiece station 7. Then, the main body 13*a* of the robot 13 moves toward the second M/C 3 while guided by the guide rail 14, and the workpiece 5, for which the first machining has been completed, is temporarily placed on the second M/C pre-machining temporary workpiece station 8, as shown by the dot-dash line. The robot 13 then stops at a predetermined position that corresponds with the second M/C 3 (the position indicated by the solid line in the middle of FIG. 7). Next, in a similar manner as before, the robot 13 grasps the workpiece 5, for which the first machining has been finished and which is at the second M/C pre-machining temporary workpiece station 8, and places the workpiece 5 on the table of the second M/C 3.

As before, the workpiece 5, for which the first machining has been finished is fixed to the table of the second M/C 2, and then a second machining is performed. When the second machining is finished by the second M/C 3, the robot 13 takes the workpiece 5 and temporarily places it on the second M/C post-machining temporary workpiece station 9. Then, the robot 13 moves again to the predetermined position (the solid line shown to the left-hand side of FIG. 7) corresponding to the first M/C 2. Then, as before, the next workpiece 5 for which the first machining has been finished is taken and temporarily placed on the first M/C post-machining temporary workpiece station 7, and yet another workpiece 5 is taken from the workpiece station 6 and placed on the table of the first M/C 2. Following this, the robot 13 moves and takes the workpiece 5, for which the second machining has been finished and which is on the second M/C post-machining temporary workpiece station 9, and temporarily places it on the nth M/C pre-machining temporary workpiece station 10.

Following this, in the manner described above, the robot 13 continues to execute the transport, mounting and removal operations with respect to each of the M/Cs 2, 3 and 4, and the M/Cs 2, 3 and 4 repeatedly perform their respective machining operations. When the nth machining by the nth M/C 4 is finished, the robot 13 takes the workpiece 5 from the nth M/C 4, and places it on the completed workpiece station 11, as a machined part 12. This machined part 12 is then carried to the next work station by a suitable device. It should be noted that it is possible to integrate the respective neighboring M/C post-machining temporary workpiece stations and the M/C pre-machining temporary workpiece stations (for example, those indicated by reference numerals 7 and 8) into a single common workpiece temporary placement point.

In the mounting and removal operations for of the workpiece 5 executed by each M/C, it is sufficient for the robot 13 to control operation of the arms 13*b* and 13*d*, and there is no need for the robot 13 to control movement of its main body 13*a*. Accordingly, the robot control is made correspondingly simpler.

However, even with the machining line 1 shown in FIG. 7, mounting and removal of the workpiece 5 by the robot 13 must be executed for each M/C, and thus the mounting and removal operations of the workpiece 5 are complicated.

Moreover, when the machining of the workpiece 5 by one M/C is finished, the robot 13 takes the workpiece 5 and temporarily places it at a temporary placement station. Following this, the robot 13 moves it to the neighboring M/C which is next in line in the upstream direction, and when the machining of this M/C is finished, temporarily places the workpiece 5 at the respective temporary placement station. The robot 13 progressively moves in sequence, in the processing flow upstream direction, while executing similar operations. However, after a new workpiece 5 is mounted in the first M/C 2, the robot 13 must travel to the M/C of the machining line 1 at which the workpiece 5 that has progressed furthest in the machining is located, i.e., where the far-end workpiece 5 is located. When this far-end workpiece 5 has been machined by the nth M/C 4, the robot 13 must travel to the nth M/C 4. Accordingly, the robot 13 must repeatedly move forward and backward and, thus as with the conventional apparatus, there is substantial wasted time in the machining operation, making the machining operation less efficient.

Further, because it is necessary to provide the temporary placement points for the workpiece 5 between each M/C, these temporary placement points must be taken into account in design of the machining line 1, unavoidably making it larger.

SUMMARY OF THE INVENTION

In light of the above described problems, it is an object of the invention to provide a machining apparatus which can simply execute a mounting and removal of a workpiece, and which can perform a machining operation more efficiently without requiring provision of temporary workpiece stations.

Moreover, it is a further object of the invention to provide a machining line which can (a) reduce operation time by performing various types of machining operations while, as far as possible, reducing wasted time in the machining operations, and (b) offer a more compact machining line configuration.

In use of the machining apparatus of the present invention, after machining of the workpiece by a machining tool fitted within a tool holder, a workpiece holding jig is fitted to the tool holder unit in place of the machining tool. Accordingly, it is possible to hold the workpiece that has been finished using the workpiece holding jig and thus to hold it within the machining apparatus. Thus, the next workpiece can easily be mounted in the machining apparatus. Further, there is no need to perform a sequence of operations, i.e., mounting the workpiece in the machining apparatus, machining the workpiece, and removing the workpiece from the machining apparatus, for the workpiece for which machining has been finished and which is temporarily held. Accordingly, the removal of the workpiece is simplified.

In one embodiment of the present invention, the machining apparatus is provided with a plurality of interchangeable machining tools for general-purpose machining, one of which tools is a workpiece holding jig. Accordingly, the mounting and removal of the workpiece can be executed simply and efficiently. If further provided with a tool changer, replacement of the workpiece holding jig can be executed more simply, and it is possible to mount and remove the workpiece even more simply and with an even greater degree of efficiency.

Because it is possible to temporarily hold the workpiece that has been machined in the machining apparatus, using the workpiece holding jig described above, there is no need to provide a temporary placement station for temporary placement of the workpiece in the vicinity of the machining apparatus. Further, the robot is no longer required to execute a temporary placement operation for the workpiece.

Moreover, because the machining line has a plurality of machining apparatuses arranged more closely in a line, since there is no need to provide space for temporary workpiece stations, it is possible to make the machining line more compact.

Further, it is possible to use the robot to mount and remove the workpiece for each machining apparatus, simply by moving the robot along the line in one direction, from one machining apparatus to the next. Accordingly, robot control is more simple. In addition, since the robot is no longer has to execute the previously described temporary placement operations, waste of time is reduced.

Thus, it is possible to perform the machining operations more efficiently, and to reduce the operational time required for fully completing the various machining operations performed for a predetermined number of workpieces.

In another preferred embodiment, the robot is provided with a mechanism for rotation of the workpiece. Accordingly, if it is necessary to invert the workpiece for machining at the next M/C, it is easily possible to rotate the workpiece using the rotation mechanism for mounting in the next M/C. Thus, even if the machining operations require the workpiece to be rotated, it is possible to reduce the time required for machining.

DETAILED DESCRIPTION OF THE PREFERRED EMBODIMENTS

Hereinafter, an embodiment of the invention will be explained with reference to the drawings.

Figure 1:
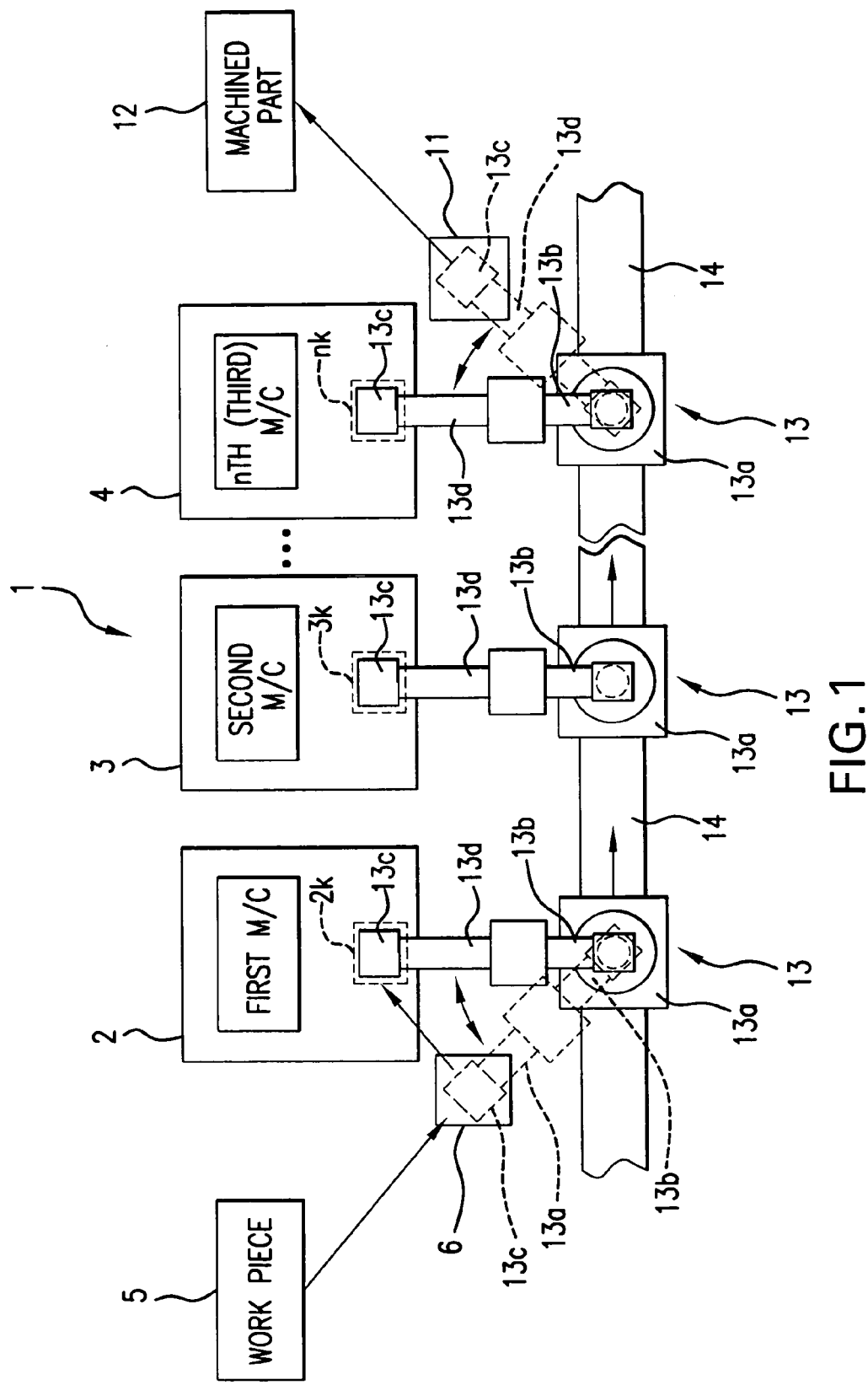
FIG. 1 is a schematic view of a machining line that includes an embodiment of a machining apparatus according to the present invention.
Figure 7:
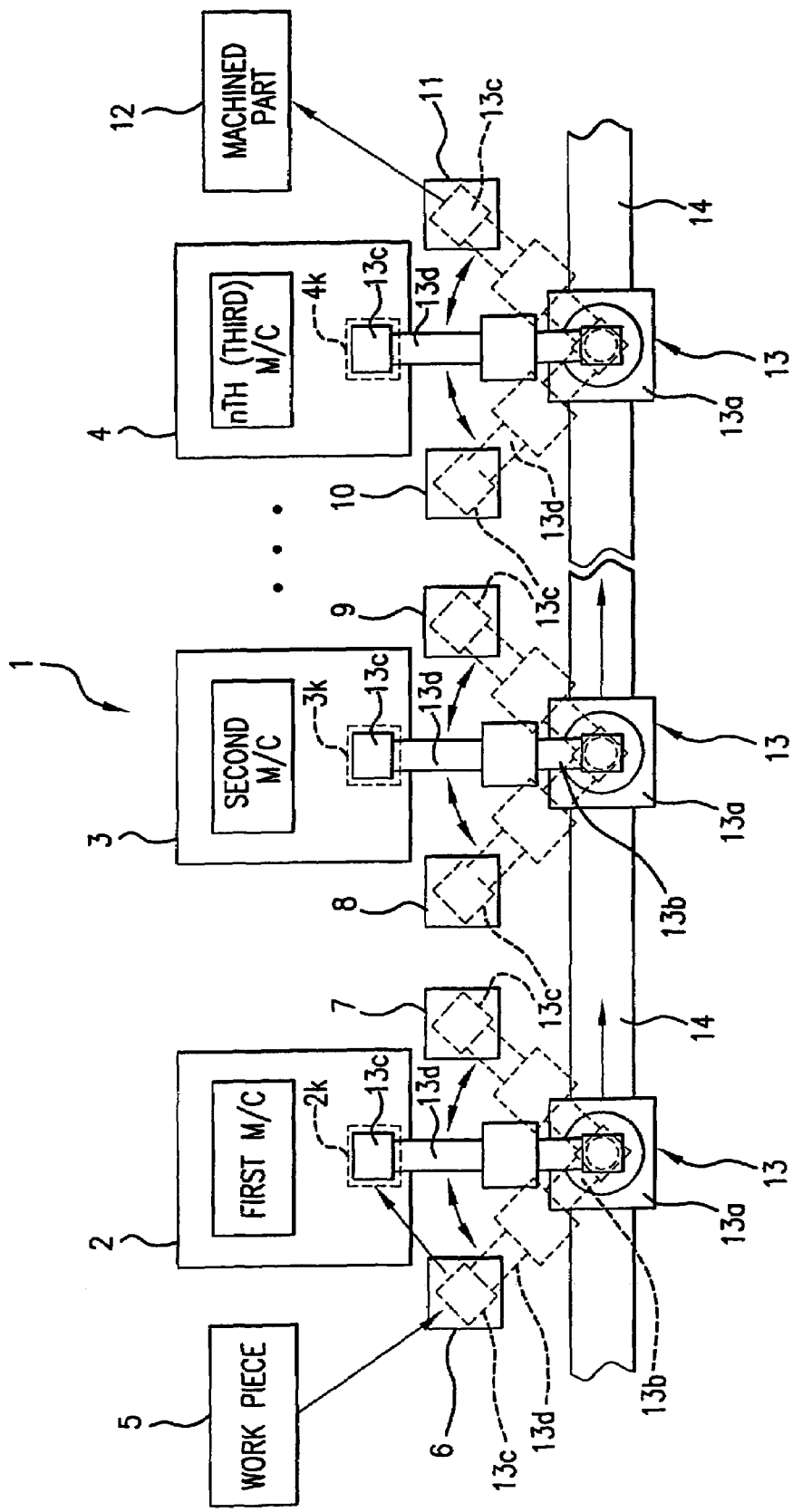
FIG. 7 is a schematic view of a conventional machining line.

FIG. 1 shows an embodiment of a machining line in accordance with the present invention, wherein components that are the same as those of the machining line shown in FIG. 7, described previously, are denoted by the same reference numerals, and explanation thereof is omitted here.

As shown in FIG. 1, the machining line 1 of this embodiment is not provided with the temporary placement points 7, 8, 9 and 10 for the workpiece 5 that are included in the machining line 1 of FIG. 7.

Figure 2:
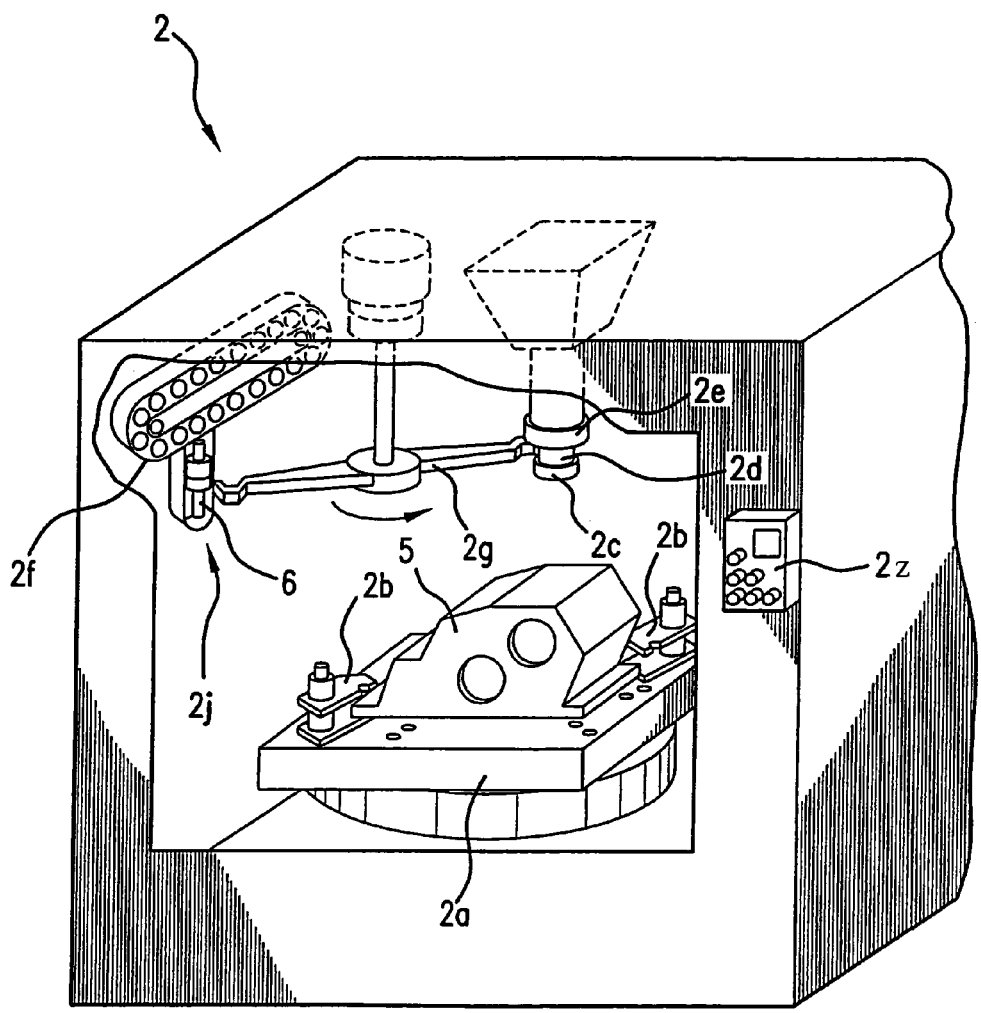
FIG. 2 is a perspective view, partially cut away, of a machining center in the machining line of FIG. 1.

FIG. 2 shows an example of a first M/C 2. The first M/C 2 includes a table 2a for fixedly supporting the workpiece 5, a clamping device 2b for fixing the workpiece 5 to the table 2a, an adapter 2d which serves as a machining tool holder of the invention by which various tools 2c are-removably held; a spindle 2e for machining using the respective tools 2c fitted to the adapter 2d, a tool storage unit 2f in which the various tools 2c are stored, and an automatic tool changer 2g. The automatic tool changer 2g automatically removes the tool 2c fitted to the adapter 2d, at any given time, and stores it in the tool storage unit 2f, and then automatically removes and fits another of the tools 2c to the adapter 2d, for the next process to be performed.

The tool storage unit 2f includes, for example, an endless belt that holds the various types of tools 2c. In the tool storage unit 2f, a tool removal storage point 2j facilitates both the removal of the respective tools 2c from the endless belt and storage and holding of the tools 2c therein, as performed by the tool changer 2g. In addition, the endless belt can be rotated so as to (a) position the required tool 2c at the tool removal storage point $2j$; and (b) position respective holding portions of the endless belt to receive replaced tools $2c$ at the tool removal storage point $2j$.

The various tools $2c$ stored in the tool storage unit $2f$ include machining tools such as drills for drilling holes in the workpiece 5, cutting tools for cutting the workpiece 5, clamping tools for operating the clamping device $2b$ so as to attach or free the workpiece 5 to/from the table $2a$, and workpiece holding jigs for holding the workpiece 5.

Figures 3A, 3B:
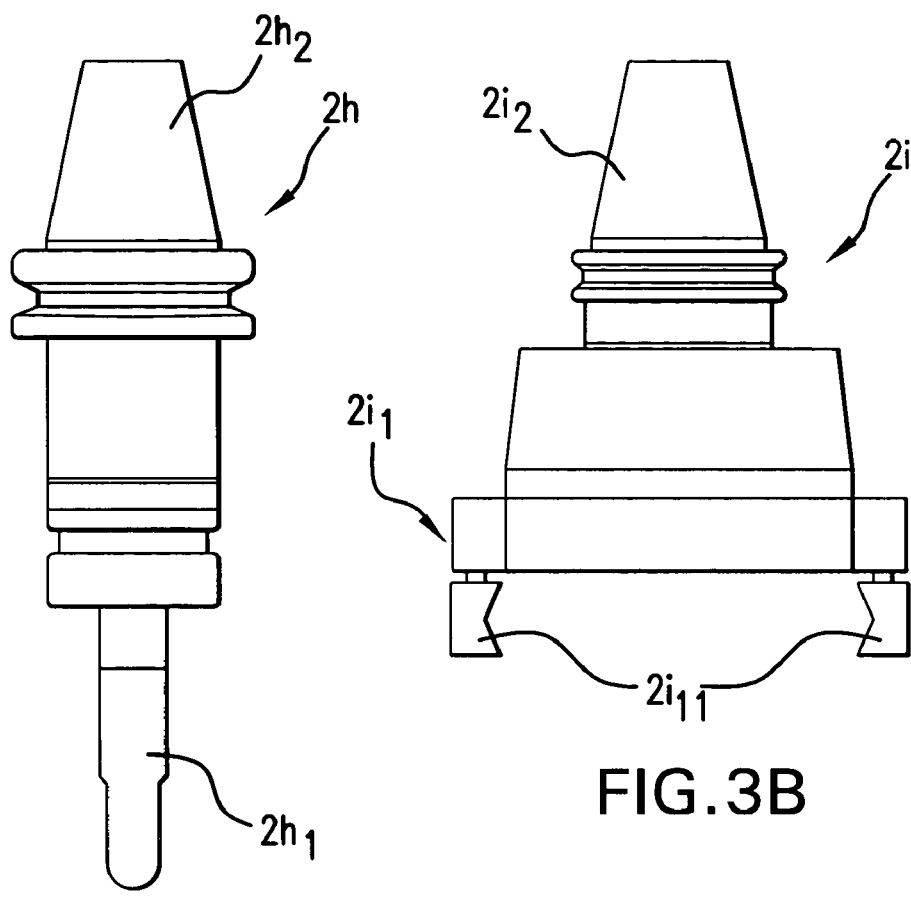
FIG. 3(a) shows a drill used as a tool used in the machining center of FIG. 2.
FIG. 3(b) shows a workpiece holding jig used in the machining center of FIG. 2.

As shown in FIG. 3(a), a drill $2h$ has a drilling portion $2h_1$ at one end for drilling the workpiece 5, and a mounting portion $2h_2$ at the other end. FIG. 3(b) shows a workpiece holding jig $2i$ having a workpiece holding portion $2i_1$ at one end, and a mounting portion $2i_2$ at the other end. The workpiece holding portion $2i_1$ has a pair of jig sections $2i_{11}$ mounted for movement in the left-right direction toward and away from each other. The workpiece 5 can be held by moving the jig sections $2i_{11}$ toward each other and released by moving the holding jig sections $2i_{11}$ away from each other. The workpiece holding jig $2i$ may be a commercially available tool, for example, an AHT (automatic handling tool) made by Captain Industries, Inc.

The mounting portion $2h_2$ of the drill $2h$ and the mounting portion $2i_2$ of the workpiece holding jig $2i$ have substantially the same configuration and may be conventional. The adapter $2d$ removably receives the mounting portions $2h_2$ and $2i_2$ so that the drill $2h$ and the workpiece holding jig $2i$ are interchangeably fitted to the adapter $2d$ (machining tool holder). Further, when the drill $2h$ or the workpiece holding jig $2i$ are held by the adapter $2d$, it is possible to operate the spindle $2e$ for hole drilling using the drilling portion $2h_1$, or workpiece retention using the pair of holding jig sections $2i_{11}$.

Each of the other tools $2c$ is provided with a functional portion at one end thereof, similar to the functional portion $2h_1$, and $2i_1$ of the drill and $2h$ and the workpiece holding jig $2i$, respectively. Further, a mounting portion (shank), similar to that of the mounting portions $2h_2$ and $2i_2$, is provided at the other end of each tool $2c$, opposite the functional portion, which can be removably held by the adapter $2d$.

FIG. 2 also shows an operation panel $2z$ of the M/C 2. The second M/C 3 and the third N/C 4 are configured in substantially the same manner as the first M/C 2 described above.

Figure 4A:
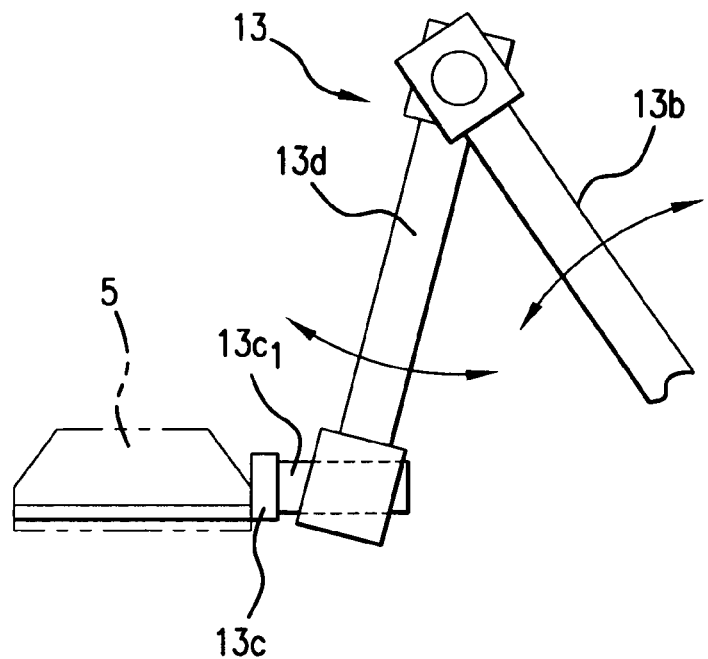
FIG. 4(a) is a schematic view of a section of a robot used in the machining line of FIG. 1, with a workpiece holder rotated to a normal position.
Figure 4B:
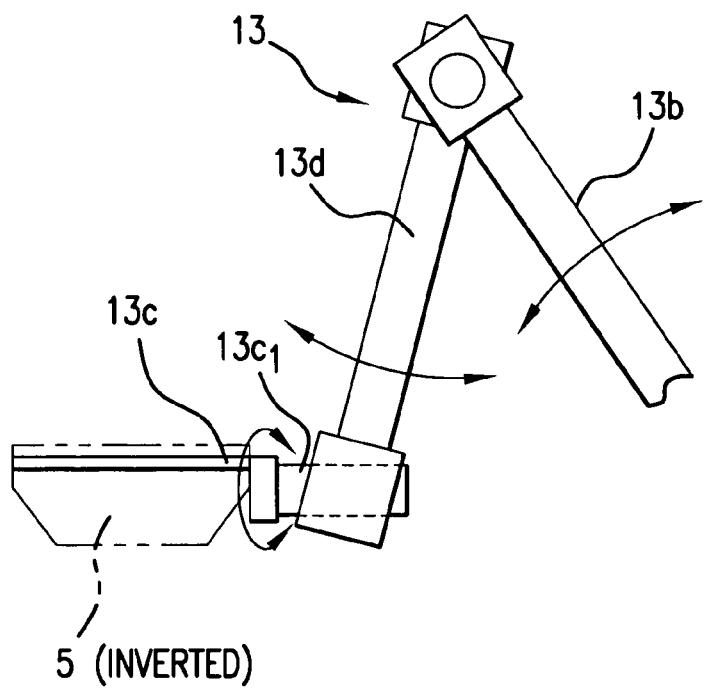
FIG. 4(b) is a schematic view of the robot with the holder rotated to a reverse position.

As can be seen from FIG. 4(b), the workpiece holder $13c$ of a robot 13 is rotatable around a horizontal shaft $13c_1$, whereby it is possible to rotate the held workpiece 5 by 180 degrees to an inverted position, or to any desired angle. The rotary drive for the workpiece holder $13c$ may be any conventional mechanism. Further, it will be apparent that the robot 13 is not limited to the above described configuration. So long as the robot can be utilized in the machining line 1 and is capable of (a) mounting and removing the workpiece 5 in/from the machining apparatus, and (b) inverting the workpiece 5, any conventional robot may be used.

Next, operation of the machining line 1 will be explained. First, as shown in FIG. 1, the workpiece 5 that is to be machined is carried to and placed on a workpiece station 6 in the vicinity of the first M/C 2. Then, the main body $13a$ of the robot 13 is made to travel to a predetermined position indicated by the solid line at the left-hand side of FIG. 1, that corresponds with the first M/C 2, and first and second arms $13b$ and $13d$ are retracted. When the first and second arms $13b$ and $13d$ have been retracted, the workpiece holder $13c$ is positioned away from the first M/C 2. Next, the robot 13 is activated and the first arm $13b$ is appropriately rotated in a horizontal plane and appropriately vertically positioned. Moreover, the second arm $13d$ is telescopically moved relative to the first arm $13b$. As a result, the workpiece holder $13c$ is positioned, as shown by the dot-dash line, at the workpiece station 6.

Next, the workpiece holder $13c$ grasps the workpiece 5 on the workpiece station 6, and then the first and second arms $13b$ and $13d$ are operated to move the workpiece holder $13c$ to the position indicated by the solid line. At this time, the workpiece 5 held in the workpiece holder $13c$ is moved to a fixing point $2k$ on top of a table $2a$ of the first M/C 2, and then the workpiece 5 is fixed to the table $2a$ at that point $2k$. Following this, the first and second arms $13b$ and $13d$ are retracted back to their original positions.

Next, the tool changer $2g$ is operated to remove a clamping tool $2c$ from storage in the tool storage unit $2f$. The tool changer $2g$ then fits this clamping tool $2c$ to the adapter $2d$. Then, the spindle $2e$ is driven and the adapter $2d$ is lowered such that the clamping tool $2c$ is placed in contact with the clamping device $2b$. At the same time, the driving power of the spindle $2e$ causes the clamping device $2b$ to be activated by the clamping tool $2c$. Accordingly, the clamping device $2b$ clamps the workpiece 5 to the table $2a$ at the fixing point $2k$.

Figure 5A:
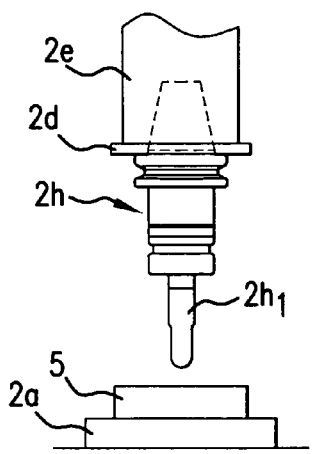
FIGS. 5A–5F show a series of operations of the machining center of FIG. 1.
Figure 5B:
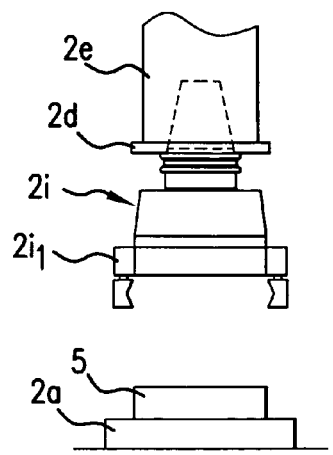

Following this, the spindle $2e$ raises the adapter $2d$ and the clamping tool $2c$ and returns them to their original positions shown in FIG. 2. Then, the tool changer $2g$ is operated to remove the clamping tool $2c$ from the adapter $2d$, and to return it to a predetermined one of the holders on the endless belt of the tool storage unit $2f$. At this time, the proper holder is positioned at the tool removal storage point $2j$. If the process to be performed by the first M/C 2 is drilling, the endless belt is rotated so that the necessary drill $2h$ is positioned at the tool removal storage point $2j$. Then, the tool changer $2g$ is operated so as to remove the drill $2h$ from the endless belt and to fit the mounting portion $2h_2$ in the adapter $2d$. Accordingly, as shown in FIG. 5(a), the drill $2h$ is fitted to the adapter $2d$. Following this, the spindle $2e$ is driven and the adapter $2d$ and the drill $2h$ are lowered while rotating. Accordingly, a hole is drilled in the workpiece 5.

When the drilling of the workpiece 5 is finished, the spindle $2e$ raises the adapter $2d$ and the drill $2h$, and returns them to their original positions. At this point, rotation of the spindle $2e$ is stopped. Following this, as described previously, the tool changer $2g$ removes the drill $2h$ from the adapter $2d$, and stores it in the predetermined holder of the endless belt of the tool storage unit $2f$. Then, the clamping tool $2c$ is once again removed from the endless belt and fitted to the adapter $2d$. Next, the spindle $2e$ is driven so as to lower the adapter $2d$ and the workpiece holding jig $2i$, and then the clamping device $2b$ is activated by the clamping tool $2c$ using driving power of the spindle $2e$. Accordingly, the workpiece 5 is released from the clamping device $2b$.

Figure 5C:
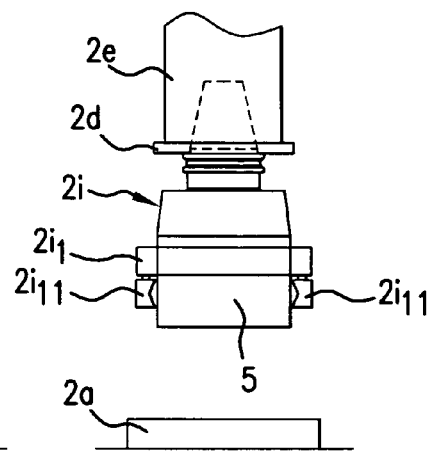
Figure 5D:
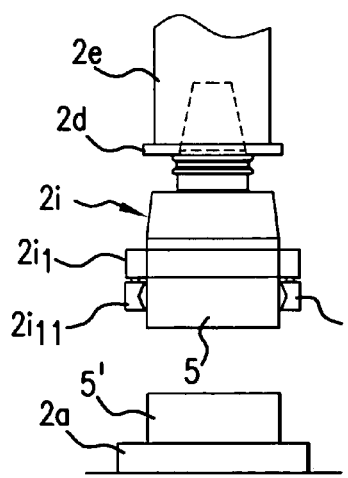

Next, the spindle $2e$ is driven so as to raise the adapter $2d$ and the clamping tool $2c$ and to return them to their original positions. Then, the tool changer $2g$ is operated to remove the clamping tool $2c$ from the adapter $2d$, and to place it in the predetermined holder on the endless belt of the tool storage unit $2f$. The tool changer $2g$ then removes the workpiece holding jig $2i$ from the endless belt, and fits the mounting portion $2i_2$ thereof to the adapter $2d$. Following this, the spindle $2e$ is driven, whereby the adapter $2d$ and the workpiece holding jig $2i$ are lowered. The workpiece holding jig $2i$ then uses driving force of the spindle $2e$ to grasp the workpiece 5. Then, the adapter $2d$ and the workpiece holding jig $2i$ are raised to their original positions by the spindle $2e$. At this time, as shown in FIG. 5(c), the workpiece holding jig $2i$ is raised while holding the workpiece 5, which now has a completed hole drilled therein. Accordingly, the workpiece 5 is raised to the position shown in FIG. 5(c).

Figure 5E:
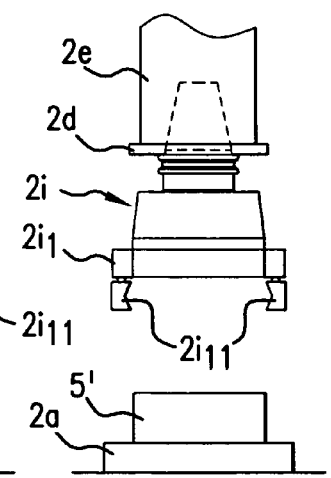

Next, the robot 13 is again activated, and in a similar manner as before, the workpiece holder 13c is again positioned at the workpiece station 6, as shown by the dot-dash line. The workpiece holder 13c, having grasped the next workpiece 5' to be machined, mounts this workpiece 5' on top of the table 2a of the first M/C 2. Then, the first and second arms 13b and 13d of the robot 13 are operated to move the workpiece holder 13c toward the workpiece 5 which is held by the workpiece holding jig 2i fitted to the adapter 2d and which now has a hole drilled therein and this workpiece 5 is removed from the workpiece holding jig 2i. Accordingly, as shown in FIG. 5(e), the workpiece 5 that has the hole drilled therein is removed from the first M/C 2, and only the unmachined workpiece 5' remains on the table 2a.

The robot 13 holding the workpiece 5 with the hole drilled therein is moved, as shown in FIG. 1, along the guide rail 14 toward the second M/C 3, and stops at a predetermined position shown by the solid line that corresponds with the second M/C 3. Next, the first and second arms 13b and 13d are activated to mount the workpiece 5 on a table of the second M/C 3 at a fixing point 3k. Following this, the first and second arms 13b and 13d are retracted.

Figure 5F:
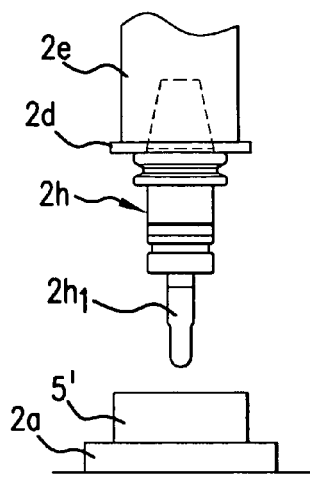

At the same time the robot 13 is moving toward the second M/C 3, in the first M/C 2 the operations described earlier are performed on workpiece 5' which is to be machined and is mounted on the table 2a, in a manner similar to the workpiece 5. Namely, the clamping of the workpiece 5', replacing of the tool 2c, machining of the workpiece 5' like that shown in FIG. 5(f), (drilling, cutting, or other machining), and clamp releasing, etc. are performed. Then, when machining of the workpiece 5' by the first M/C 2 has been completed, it is raised to the same raised position as shown in the previously described FIG. 5(c).

Next, in the second M/C 3, a hole is drilled in workpiece 5 which is mounted on the table. Thus, as previously described with regard to the workpiece 5 in the first M/C 2, the operations of clamping of the workpiece 5, replacing the tool, machining the workpiece 5 as in FIG. 5(a), and the releasing of the clamp, etc. are performed. Then, the workpiece 5 that has been machined by the second M/C 3 is raised to the same raised position shown for the workpiece 5 in the previously described FIG. 5(c).

Meanwhile, the body 13a of the robot 13, with its first and second arms 13b and 13d retracted, is moved along the guide rail 14 toward the first M/C 2, and stops at the predetermined position which corresponds to the first M/C 2. Then, in the same manner as described previously, the robot 13 takes yet another unmachined workpiece which is placed on the workpiece station 6, and mounts it on the fixing point 2k of the first M/C 2. Next, in a similar manner as before, the robot 13 removes the workpiece 5' which has been machined by the first M/C 2 and which is held in the raised position by the workpiece holding jig 2i of the first M/C 2, and moves it to the second M/C 3. Then, the robot 13 stops at the predetermined position corresponding to the second M/C 3 and mounts the workpiece 5' on the table of the second M/C 3 at the fixing point 3k.

Following this, the robot 13 takes the workpiece 5 which has been machined by the second M/C 3 and which is held in the raised position by the workpiece holding jig 2i, and moves it to the third M/C 4. Then, the robot 13 stops at a predetermined position corresponding to the third M/C 4 and mounts the workpiece 5 at a fixing point on top of the table of the third M/C 4. Following this, the first and second arms 13b and 13d of the robot 13 are retracted.

Then, in a manner similar to that previously described, the first M/C 2, the second M/C 3, and the third M/C 4 machine the respective workpieces 5, namely, clamping respective workpieces, tool replacement, machining of the workpieces 5, and clamp releasing. Then, the respective workpieces 5, that have been machined by the first, second and third M/Cs, are lifted to their raised positions, in a manner similar to that previously described.

Then, when the machining by the third M/C 4 is finished, the robot 13 takes the first workpiece 5, that is held in the raised position at the third M/C 4, from the workpiece holding jig 2i, and places it as a machined part 12 at the completed workpiece station 11. Following this, the machined part 12 is carried from the completed workstation 11 to the next work location.

It should be noted that, if it is necessary to turn the workpiece 5 to a desired angle for machining at a subsequent M/C it is possible to turn the workpiece 5 using the rotation mechanism of the robot 13 for mounting in the subsequent M/C.

The workpieces 5 can be temporarily held by the respective workpiece holding jigs 2i while the next workpiece 5 which is to be machined is mounted and fixed to the respective tables of each of the M/Cs 2, 3 and 4. Accordingly, in order to fix the workpiece 5 to be machined to the respective fixing points of the M/Cs it is not necessary to provide temporary workpiece stations for temporary placement of the machined workpieces 5 in the vicinity of each M/C as shown in FIG. 7. Further, the robot 13 does not need to execute the additional temporary placement operations for the workpieces 5.

Moreover, the machining line 1 can be configured with the M/Cs 2, 3 and 4 closely spaced in line since there is no need to provide spaces for temporary workpiece stations and, accordingly, it is possible to make the machining line 1 more compact.

Further, it is possible to mount and remove the respective workpieces 5 for each M/C simply by moving the robot 13 in one direction along the guide rail 14 from the first M/C 2 toward the third M/C 4. Accordingly, robot operation control is simplified. Further, as will be clear from the above description, temporary placement of the workpiece 5 by the robot 13 is no longer required and thus wasted time can be minimized.

In this way, it is possible to perform the machining operations efficiently, and to reduce the time required for the various machining operations of the machining line 1 performed for a given number of workpieces 5.

Further, the robot 13 is provided with a mechanism for rotating the workpiece 5. Accordingly, if it is necessary to rotate the workpiece 5 to a desired angle (which includes 180 degree inversion), between machining operations at adjacent M/Cs, it is easy to rotate the workpiece 5 using the rotation mechanism prior to mounting it in the next M/C. Thus, even if one or more of the machining operations requires the workpiece 5 to be rotated, it is possible to substantially reduce the total time of the various machining operations in a highly effective manner.

Moreover, at each of the M/Cs 2, 3 and 4, the workpiece 5 for which machining has been finished is removed from the machining position (the fixed point) and temporarily held. As a result, it is possible to easily mount the next workpiece 5 on the M/C. Further, since there is no need for serial mounting and removal of the machined workpiece at each M/C, the workpiece 5 can be removed from each M/C more easily.

Figure 6:
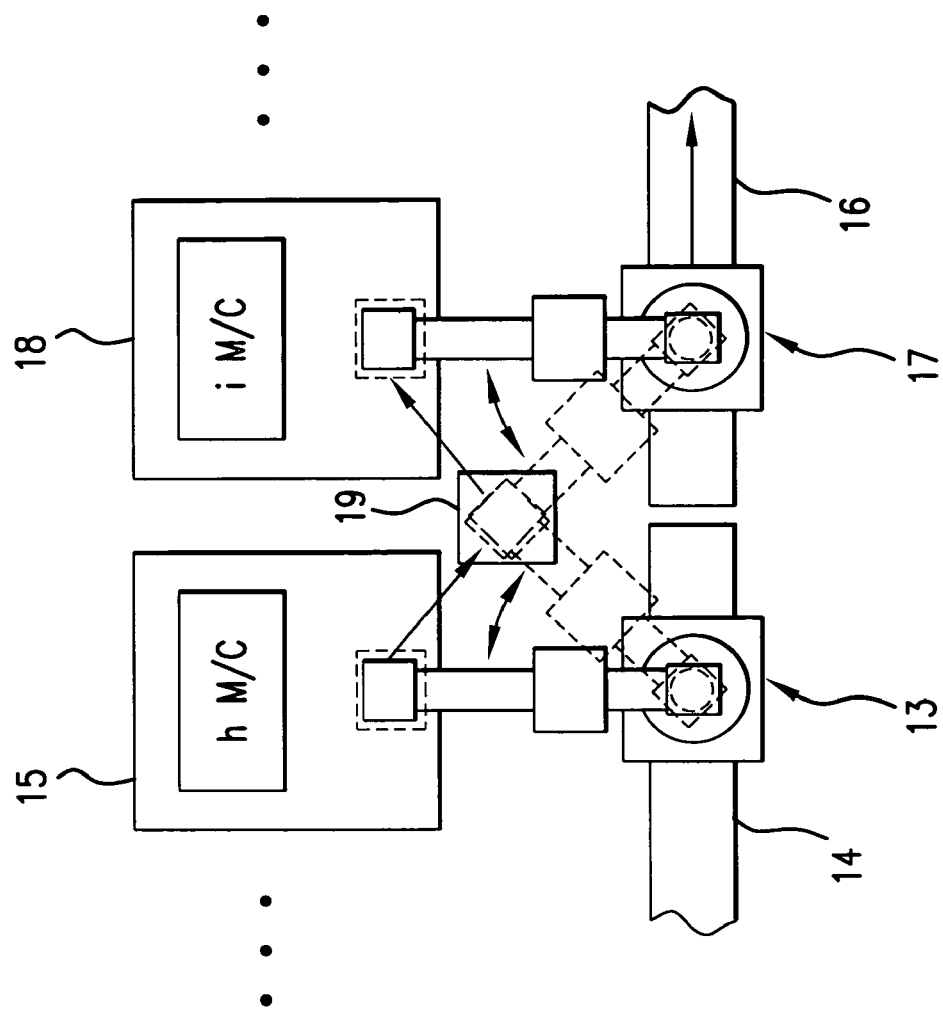
FIG. 6 is a sectional view of a modified embodiment of the machining line of the invention.

Further, with the machining line 1 shown in FIG. 1, a single robot 13 is provided for transporting, mounting and removal of the workpiece 5 for the M/Cs. However, the invention is not so limited. For example, a predetermined number of M/Cs may be provided with a first robot for transport, mounting and removal of the workpiece 5 and the remaining M/Cs may be provided with a second robot for transport, mounting and removal of the workpiece 5. For example, as shown in FIG. 6, the machining line of the invention may have a shared placement point 19 used both by a first robot 13, which moves along the guide rail 14 and which handles the workpiece 5 for an h M/C 15, and a second robot 17, which moves along another guide rail 16 (which may be the same as the guide rail 14) and which handles the workpiece 5 for an i M/C 18.

Moreover, in the above-described embodiments M/Cs are utilized as the machining apparatuses. However, the machining apparatus of the invention is not limited to an M/C, and the invention may be applied to other devices such as general-purpose machines or specialized machines. For example, the present invention may be applied to a general-purpose machine by providing the workpiece holding jig 2i as one of the tools thereof, so as to make it possible to more simply and efficiently mount and remove the workpiece for the general-purpose machine. In addition, the invention may be favorably applied to an M/C that is provided with an automatic tool changer.

Further, in the above described embodiments, the plurality of M/Cs are positioned in a straight line. However, the configuration may have the plurality of M/Cs arranged in a circle, along a curved line or along a line that includes both straight and curved sections.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A machining line, comprising:
   a plurality of machining centers arrayed side-by-side and a workpiece holding center at a front end of the machine center array, each machining center having a machining apparatus comprising:
   a table for fixably mounting a workpiece;
   a plurality of machining tools, each of said machining tools being of a different type and being capable of performing a different type of machining for the workpiece;
   a workpiece holding jig for holding the workpiece; and
   a machining tool holder for removably holding and driving one of the plurality of machining tools to machine the workpiece and for removably holding and driving the workpiece holding jig to grasp a machined workpiece on the table and to raise the machined workpiece to a raised position above the table; and
   a tool changer for removing one of the plurality of machining tools from the tool holder, for retrieving a different machining tool from among the plurality of machining tools, and for fitting the retrieved machining tool to the tool holder; and
   the machining line further comprising a robot movable along the machining line for, in sequence at a first machining center, picking up a first workpiece from the workpiece holding center, placing the first workpiece on the table of the first machining center, after machining of the first workpiece picking up a second workpiece from the workpiece holding center, placing the second workpiece on the table of the first machining center, and grasping the machined first workpiece in the raised position and removing the machined first workpiece from the workpiece holding jig.

2. The machining line according to claim 1 wherein said robot, in a continuation of the sequence, transports the machined first workpiece in a direction along the machining line to a second machining center next adjacent the first machining center, places the machined first workpiece on the table of the second machining center, grasps a third workpiece at the raised position at the second machining center, transports the third workpiece in said direction along the machining line to a third machining center next adjacent the second machining center and places the third workpiece on the table of the third machining center.

3. The machining line according to claim 1, wherein:
   the robot is provided with a rotation mechanism for rotating the workpiece to properly orient the workpiece for each machining apparatus.

4. A method of machining workpieces comprising:
   providing a plurality of machining centers arrayed side-by-side along a machining line, a workpiece holding center at a front end of the machining line and a robot movable along the machining line, each machining center having a machining apparatus comprising:
   a table for fixably mounting a workpiece;
   a plurality of machining tools, each of said machining tools being of a different type and being capable of performing a different type of machining for the workpiece;
   a tool storage unit for storing the plurality of machining tools;
   a workpiece holding jig for holding the workpiece;
   a machining tool holder for removably holding and driving one of the plurality of machining tools to machine the workpiece and for removably holding and driving the workpiece holding jig to grasp a machined workpiece on the table and to raise the machined workpiece to a raised position above the table;
   a tool changer for removing one of the plurality of machining tools from the tool holder, for retrieving a different machining tool from among the plurality of machining tools in the tool storage unit, and for fitting the retrieved machining tool to the tool holder;
   grasping a first workpiece at the workpiece holding center with a hand of the robot;
   moving the hand of the robot to place the first workpiece on the table at a first of the machining centers;
   fixing the first workpiece to the table at the first machining center;
   machining the first workpiece with a first machining tool;
   by operation of the tool changer, removing the first machining tool from the machine tool holder and storing the first machining tool in the tool storage unit;
   by operation of the tool changer, removing the workpiece holding jig from the tool storage unit and inserting the workpiece holding jig into the machining tool holder;
   grasping the machined first workpiece with the workpiece holding jig and raising the machined first workpiece to the raised position;
   grasping a second workpiece at the workpiece holding center with the hand of the robot;
   moving the hand of the robot to place the second workpiece on the table at the first machining center;
   moving the robot hand to grasp the machined first workpiece at the raised position and removing the workpiece, grasped in the robot hand, from the workpiece holding jig and from the first machining center.

5. The method of machining according to claim 4 further comprising:
- transporting the machined first workpiece in a direction along the machining line to a second machining center next adjacent the first machining center;
- placing the machined first workpiece on the table of the second machining center;
- grasping a third workpiece at the raised position at the second machining center;
- transporting the third workpiece in said direction along the machining line to a third machining center next adjacent the second machining center; and
- placing the third workpiece on the table of the third machining center.

* * * * *